Dec. 27, 1949  G. T. SALINGER  2,492,445
APPARATUS FOR THERMOSTATICALLY CONTROLLING
THE FLOW OF A FLUID FUEL
Filed April 5, 1945  2 Sheets-Sheet 1
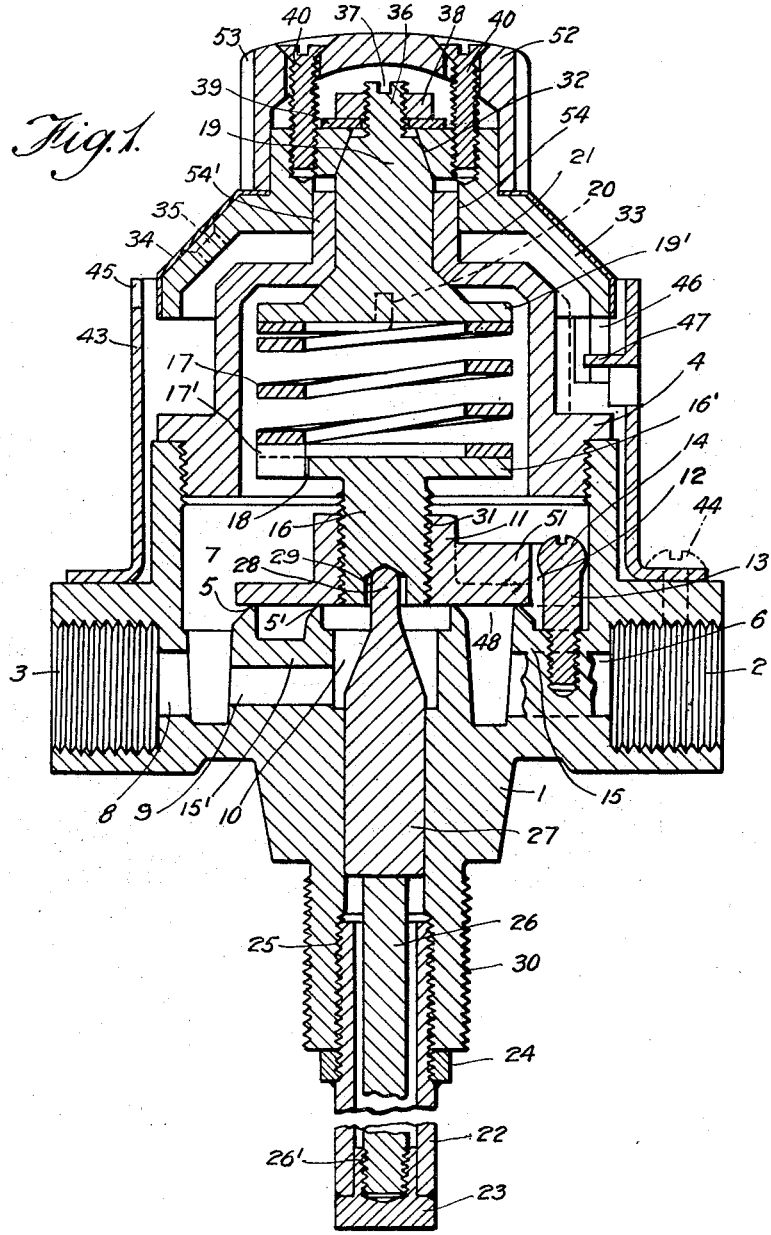
INVENTOR
GERHARD TEDDY SALINGER
by Frederick E. Hane
his attorney Dec. 27, 1949   G. T. SALINGER   2,492,445
APPARATUS FOR THERMOSTATICALLY CONTROLLING
THE FLOW OF A FLUID FUEL
Filed April 5, 1945   2 Sheets-Sheet 2

INVENTOR
GERHARD TEDDY SALINGER
by Frederick E. Hay
his attorney

Patented Dec. 27, 1949

2,492,445

UNITED STATES PATENT OFFICE 2,492,445

APPARATUS FOR THERMOSTATICALLY CONTROLLING THE FLOW OF A FLUID FUEL

Gerhard Teddy Salinger, Birmingham, England, assignor of one-half to Otto Ney, London, England Application April 5, 1945, Serial No. 586,775
In Great Britain March 29, 1944

8 Claims. (Cl. 236—102)

This invention relates to apparatus for thermostatically controlling the flow of a fluid fuel and thereby the temperature of an oven, stove, furnace, refrigerator and the like where the temperature can be regulated by the amount of fuel which is burnt for the purpose of heating or cooling. The invention is also applicable to apparatus which are provided to act as safety devices by cutting off a fuel supply if a pilot light is extinguished or fails for any reason, e. g. due to a temporary failure of the fuel supply.

Apparatus of this kind comprise a valve for the fluid fuel whose distance from its seating is controlled by a heat responsive member. The latter may comprise a rod arranged in, and at one end connected to a tube of material whose coefficient of thermal expansion is different from that of the tube, or it may comprise a bi-metal strip, or a bellows with a liquid or vapour or both contained in the bellows or between the bellows and a casing surrounding it. If the temperature changes the heat responsive element moves the valve towards or away from an annular seating between a fuel inlet and outlet. The movements resulting from such temperature changes and which can be transferred from the heat responsive member to the valve are relatively small and it will be understood that the controlling effect and accuracy of an apparatus of the kind described must depend on both the size of the heat responsive member and the size of the valve, or from another aspect on the change in cross sectional area of the passage for the fuel which at a certain temperature change takes place in a certain time, i. e. from the linear dimension, for instance the diameter, of the valve seating and the distance which the valve is moved by the action of the heat responsive member. As both the size of the heat responsive member and the size of the valve are limited for practical purposes it was difficult to manufacture satisfactory apparatus of the kind described.

According to this invention the efficiency and accuracy of apparatus of the type described can be greatly improved without substantially increasing their size.

One object of this invention resides in providing such an apparatus with a thermostatically controlled valve which has more than one seat, i. e. is suitable to be seated on more than one seating so as to control more than one passage for the fluid fuel.

The multiple seatings can be formed by a number of concentric walls in the casing of the valve, the spaces between the said walls being alternately connected to the inlet and outlet in the valve casing.

Any heat responsive member of a customary type as described before can be used for thermostatically controlling such a multiple seat valve, whilst the cross section of the fuel passage, i. e. the cross sectional area through which the fuel flows and the change in this section afforded by a certain movement of the heat responsive member are greatly increased. In an apparatus having a single seat valve only, the quantity of fuel passing at a certain pressure during a certain time is proportional to the diameter of the seating and to the distance between the valve and the seating. In an apparatus with a multiple seating the fuel passage is proportional to the sum of the seating diameters and to the distance between the valve and the seatings. Therefore an apparatus with a multiple seating is equivalent to an apparatus with a single seating whose diameter is approximately equal to the sum of the diameters of the several seatings. If a given fuel rate has to pass through the apparatus the valve must be at a certain distance from the seating. If for example the seating diameter or equivalent seating diameter is doubled, the distance can be halved for the same fuel passage. As at a certain temperature change a heat responsive member of a given size moves the valve a certain distance it is obvious that the apparatus with a multiple seat valve will react sooner, i. e. to a smaller temperature variation, than an apparatus with a single seat valve of the same overall size.

An apparatus according to my invention can be set manually to the required working temperature in a well-known manner, viz. by either moving the valve axially towards or away from the multiple seating independently from the movement of the heat responsive member, or by moving the multiple seating axially towards or away from the valve. A further object of this invention is to improve both the accuracy of the initial setting to the rest or start position and of the manual setting of the apparatus to a working temperature.

Usually the initial setting of the apparatus is so, that at a given temperature a certain amount of gas or other fuel per hour passes the apparatus. For this purpose the valve is brought into the desired distance from the seating, and then the manually operated dial or graduated head is fixed in the desired position to an actuating member.

This adjustment is made possible by providing the outer end of a spindle acting as an intermediary between the setting head and an actuating member for the valve, with a cone which fits into a tapered hole in the centre of the dial or graduated head, both parts being fixed together in the desired position by means of a screw or nut. According to this invention, a cylindrical guide is provided for the dial or graduated head, whereby the initial setting or resetting of the apparatus is greatly facilitated, and can be done more accurately.

Guided by a cylindrical surface, the dial or graduated head whilst being set, can only be rotated, or moved in an axial direction by lifting it slightly off the cone of the spindle. Thus the dial or graduated head is invariably kept in a central position.

Preferably the cylindrical guide is provided by a protruding cylindrical boss of the casing of the apparatus or its lid with a gliding fit into a cylindrical hole of the dial or graduated head. Alternatively the cylindrical boss could be on the dial or graduated head, and the cylindrical hole in the casing or its lid. As another alternative the cylindrical boss may be a separate part fixed either on the casing, or on the dial or graduated head respectively. The graduations or divisions of the dial or graduated head may either be marked on this part itself or on a strip or cap which is fixed to this part.

The adjusting means are preferably concealed by a cap of a material of low heat-conductivity such as plastic material. This cap may form a handle for setting the thermostat manually to the required temperature. Preferably the dial or graduated head has at or near its periphery a projection which, together with a lug provided on the casing or on a part connected to it, limits the extreme setting of the dial.

The greater working accuracy made possible by the arrangement of a multiple seating of the valve would be of no avail if the manual setting to the required working temperature would not be equally accurate. Therefore it is a further object of the invention to reduce to a minimum any possible backlash and the consequences of any slight non-alignment by the employment as an intermediary connecting member, of a coiled compression spring of rectangular cross section. One end of the spring is connected to a stem or spindle to which the dial or graduated head is fixed. The other end is connected to an actuating member, which regulates the axial distance between the valve and the seating in accordance with the manual setting. For connecting either end of the spring to the before mentioned parts the ends are bent substantially at right angles to the turns of the coils i. e. parallel to the axis of the spring and are engaged in respective slots of those parts. A further object of this invention is to use a helical compression spring of rectangular cross section which is "edgewise" coiled, i. e. so that the longer sides of the flat cross sections are situated at right angles to the axis of the spring. Thus it is ensured that the rotary setting motion imparted to the dial or graduated head is transmitted through the spring to the actuating member without any winding or unwinding action of the spring itself, and a fine adjustment of the required distance of the valve from the seating is made possible. The spring, therefore, keeps the valve indirectly or directly in close contact with the heat responsive member, so that it can follow its movements exactly, transfers the rotary movement from the dial or graduated head for the purpose of manual setting, and compensates slight inaccuracies in the alignment of the spindle fixed to the dial or graduated head and the axis of the seating. Moreover, the employment of this type of spring reduces the back-lash to a negligible quantity as compared with the sliding connections used before.

If for the purpose of the manual setting a screw threaded actuating member is used for transforming the rotary motion of the dial or graduated head to an axial movement of the valve, the latter is preferably prevented from turning by a suitably arranged peg which fits in a slot of the valve. If this peg is provided with a ball-head the valve can easily make small tilting movements in all directions. Especially by using the ball-headed peg in connection with the rectangular cross-section spring mentioned before, the valve becomes self-aligning and will always be properly seated if touching the seating. Thus, small inaccuracies in alignment will be completely compensated.

Other objects of my invention and more details will be apparent from the following description referring to the drawings which illustrate by way of example some embodiments of my invention.

Figure 1 shows a section of an apparatus controlled by a heat responsive member of the brass-tube nickel-steel type.

Figure 2:
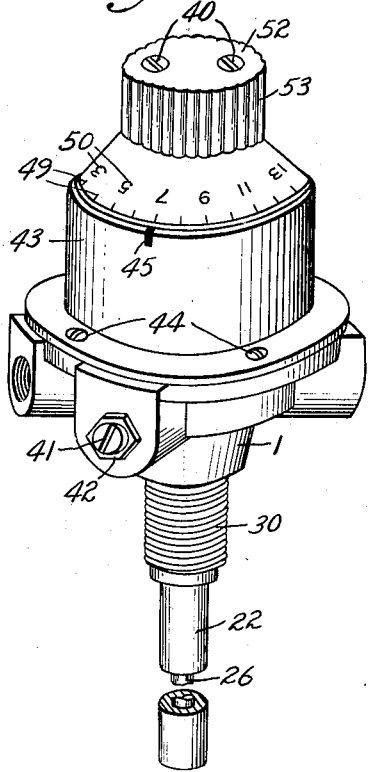
Figure 2 is a perspective view of the same.

In Figures 1 and 2, 1 is the body or casing of the apparatus, 2 the fuel inlet, 3 the fuel outlet. The fuel passes from the inlet 2 through passage 6 into the annular space 48. This annular space is situated between the two concentric seatings 5 and 5'. The passage 6 is conveniently drilled in a bridge 15 between the outer seating 5 and the inlet 2. If the valve 11 is lifted off the seatings 5 and 5', the fuel passes from the annular space 48 over both the seatings 5 and 5' directly to the space 7 from the outer seating 5 and from the inner seating 5' via space 10, passage 9, conveniently drilled in a bridge 15' between both the seatings 5 and 5', from there to the space 7, and then both the branches of the fuel unite and flow via the passage 8 to the outlet 3.

The heat responsive member of the tube and rod type comprises a tube 22 made of a material of high coefficient of expansion such as brass, closed at one end by a plug 23, conveniently brazed in, the other end of the tube being screwed into the body 1 by means of a threaded end 25, a nut 24 brazed to the tube 22 forming a stop; and a rod 26 having a low coefficient of expansion, conveniently screwed into the plug 23 by means of the threaded end 26'.

The movement of the heat responsive member is transferred to the valve by a piston-like part 27 fitting with a gliding fit in the body 1. This piston 27 transfers the movement to a screw threaded actuating member 16 and from this, by means of the thread 31 to the valve 11. This valve can only move axially and is prevented from any rotary movement by a peg 13, which is screwed into the bridge between the outer seating 5 and the outer wall of the body 1. The peg 13 fits snugly into a slot 12 of the valve 11, it can have a ball-head 14. This ball-head acts as a gliding universal joint and permits the valve 11 to make small tilting movements in all directions. In order to keep the ball-head 14 always inside the slot 12 the valve 11 is provided with a thicker portion, e. g. a rib 51. The valve 11 will, therefore, always be properly seated if moved against the seating 5 and 5' even if the piston 27 and the member 16 are somewhat out of alignment. For this purpose the piston 27 has a ball-headed cylindrical end 28 which loosely fits into a hole 29 of the member 16.

The body 1 is closed by a screwed in or otherwise gas-tightly fitted lid 4. A spindle 19 is so fitted in the centre of the lid 4, that it can be turned manually. The tapered part 21 fits into an equally tapered hole of the lid 4 and is preferably ground in, in order to prevent any fuel leakage.

Between the disk-like part 19' of the spindle 19 and the disk-like part 16' of the member 16, an edgewise coiled compression spring 17 of rectangular cross-section is arranged. Both ends 17' of the spring 17 are bent up at right angles i. e. parallel to the axis of the spring. These bent-up ends 17' of the spring 17 fit closely into slots 18 and 20 of the disk-like parts 16' and 19' respectively. The spring 17 presses the spindle 19 against the tapered shoulder 21 of the lid 4, thus forming a gas-tight fit, and also presses the valve 11 against the piston 27 and the piston 27 against the nickel-steel rod 26. In this manner, the movements of the heat responsive member are transferred without play to the valve 11. Furthermore, the spring 17 imparts the rotary movement of the spindle 19 to the member 16 practically without back-lash, and at the same time compensates any small inaccuracies in the alignment of the spindle 19 and of the valve 11, and allows small tilting movements of the valve 11 in order to get it properly seated. Because of this self-aligning of the valve it is possible to employ knife-edge valve seatings 5 and 5'.

A dial or graduated head 33 is fixed to the top of the spindle 19. The head can be marked either directly with divisions and/or figures, or a separate strip 34, on which similar divisions and/or figures are marked may be fastened to the head by means of screws 35. Such markings to indicate the temperature to which the apparatus is set may be in degrees of Fahrenheit, or in centigrades, or in figures or letters the significance of which is known to the user of the apparatus.

In order to make the initial setting of the heat responsive member possible the spindle 19 is provided with a tapered end 32 which fits in a hole with the same taper situated in the centre of the dial or graduated head 33. The initial setting of the thermostat can be done by turning the spindle 19 by means of a screwdriver which is inserted in slot 37 on top of the spindle 19. This done, the dial or graduated head 33 is fixed by tightening the nut 38 on the screw threaded end 36 of the spindle 19. A washer 39 may be provided. A cap 52, preferably made from plastic material, fixed by screws 40 conceals this arrangement, and it serves also as a knob for turning the dial or graduated head 33, for which purpose it is provided with any type of flutes or ribs 53 to give the knob a good grip.

In order to facilitate the initial setting of the instrument and to make it more accurate, a cylindrical guide 54 of the graduated head or dial 33 may be provided, thus keeping it invariably in a central position, even if it is slightly lifted off the cone 32 for the purpose of the initial setting. Instead of the illustrated arrangement a cylindrical boss may be on the graduated head and an adequate hole may be provided in the lid or in the body of the casing or in a part fixed thereon.

For the purpose of setting the thermostat manually to various temperatures a vizor 43 with an indicating slot 45 may be provided. This vizor 43 is fixed to the body 1 or lid 4 by means of a number of screws 44.

In order to limit the manual turning of the dial or graduated head 33 in the extreme positions, a stop is provided by a projection 46 of the dial or graduated head and a projection 47 of the vizor 43 pointing inwards. Such a stop may, of course, be formed by a part of the lid 4 or of the body 1 or a part fixed thereon.

The operation is as follows:

The dial or graduated head 33 is manually turned so that the required marking of the temperature 50 is opposite the slot 45 of the vizor 43. This moves the valve 11 into the desired distance from the valve-seatings 5 and 5'. The heat responsive member 22, 26 is in direct contact with the medium to be controlled. When the temperature of the medium rises, the tube 22 expands more than the rod 26. By this the valve 11 is moved towards the seatings 5 and 5' thus reducing the fuel-flow, and vice versa, when the temperature falls.

In Figure 2 a sometimes necessary by-pass screw 41 secured by a lock-nut 42 is shown. This by-pass screw provides in a well known manner and not shown in these drawings a by-pass between inlet and outlet in order to allow a small and adjustable amount of fuel to pass through the instrument even if the valve is closed. This is often done to prevent complete extinguishing of the burner to be controlled, or back-firing, or both. The threaded end 30 of the body is provided for fixing the thermostat to the appliance to be controlled.

Figure 3:
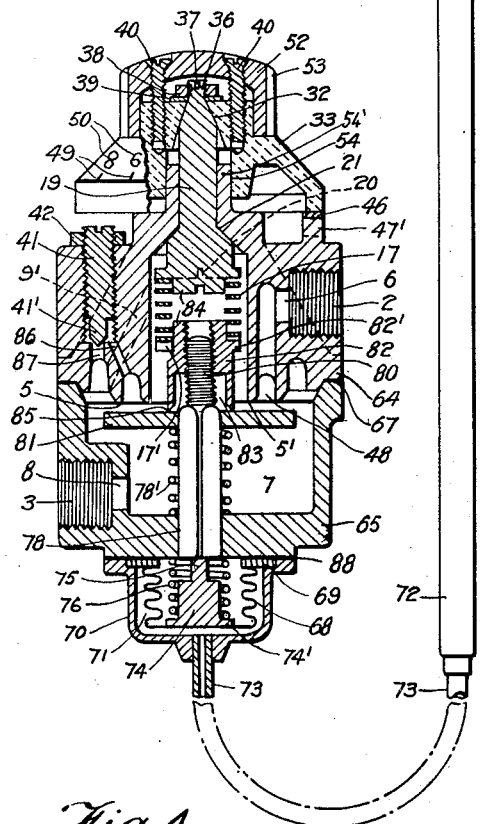
Figure 3 shows a section of an apparatus controlled by a heat responsive member of a bellows type.
Figure 4:
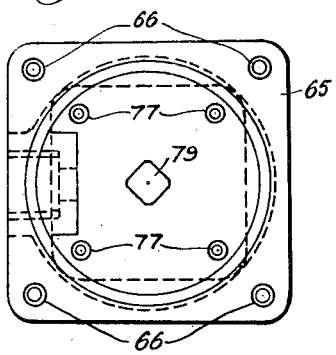
Figure 4 is a top view of the lower body of this apparatus.

In Figures 3 and 4 an apparatus with a bellows-type heat responsive device is shown. The bulb 72 is filled with a liquid or vapour or both, having a suitable coefficient of expansion and a suitable temperature range, and is connected by means of a capillary tube 73 to a casing 70 in which the bellows 68 are fixed by means of a plate 69. The capillary-tube 73 and the space 71 between the bellows 68 and casing 70 are also filled with the mentioned liquid or vapour or both. This system forms the heat responsive member. All the necessary joints in this system are made pressure-proof e. g. by soldering. The casing 70 is gas-tightly fixed to the lower body 65 by means of screws fitting in tapped holes 77 of the lower body 65 and of the gasket 88. The movements of the bellows 68 are transferred to the piston-like part 74, held in position by means of the compression-spring 76 which presses on one side against the shoulder 74' of the piston 74, and on the other side against the lower body 65. This spring brings the bellows 68 back to the original position after being compressed. The piston 74 transfers the movement to the peg 78 which has a square or similar section to prevent any rotary movement by being guided in an adequate hole of the same shape 79 in the lower body 65. This peg 78 has a screwed extension 80 on which the valve-nut 82 is screwed. A seat-like extension 85 usually touches the valve 81 which is movable on peg 78 with a gliding fit and pressed upwards by means of the compression spring 78'. An adequate hole 83 in the valve-nut 82 is provided so that the square or similar shaped part of peg 78 can pass into it.

It is obvious that if the bulb 72 placed into the medium to be controlled heats up, the liquid or vapour or both inside expand, the bellows 68 are compressed, the piston 74, the peg 78, the valve-nut 82 move, and the valve 81 being pressed by the compression-spring 78' against the seating 85 of the valve-nut 82, also moves towards the seatings 5 and 5' arranged in the upper body 64. If the temperature to which the bulb 72 is exposed, is higher than the one to which the apparatus is manually set, no breakage can occur as the valve 81 is pressed against the seatings 5 and 5' by means of a spring 78' so that peg 78 and valve-nut 82 can move further upwards.

The fuel inlet 2 is in the upper body 64 and a gasway 6 is provided leading as before into the annular space 48 between the two seatings 5 and 5'. The fuel outlet 3 with gas-way 8 is arranged in the lower body 65. The space inside seat 5' is connected to space 7 by means of a drill hole 9' (dotted in).

A by-pass screw 41 with a pointed end 41' secured in its desired position by the lock-nut 42 regulates the connection between inlet and outlet by means of the drill-holes 86 and 87.

Otherwise the arrangement of the parts in and on the upper body 64 are quite similar to those described in the previous examples. The same reference numbers refer to the corresponding parts.

The only variations shown are that the spindle 19 and the valve-nut 82 the equivalent to the plug-like actuating member 16 in Fig. 1 have cylindrical extensions 84 to form a guide for the spring 17. A similar spring guide can, of course, also be provided on an apparatus as shown in Figure 1. Furthermore the lug 47' forming the stop together with the projection 46 of the graduated head or dial 33 is part of the upper body 64 and the divisions 49, and markings 50 are provided direct on the graduated head or dial 33.

Other variations are possible within the scope of this invention. Where required, more than two seatings can be provided, and it is only necessary that the annular spaces between the seatings are connected alternately to the inlet and the outlet of the apparatus.

I claim as my invention:

1. An apparatus for thermostatically controlling the flow of a fuel fluid comprising a housing including a fluid duct, a valve controlling the fluid duct by the valve position, a valve actuating member threaded upon the valve, a temperature responsive member engaging the valve actuating member for control of the valve position by the temperature response member, a manually operable rotatable setting member, a spindle and an edgewise coiled compression spring of substantially rectangular cross-section operatively connecting the setting member and the valve actuating member for adjusting the valve relative to the actuating member and thereby the valve position, said spring being connected to the spindle and the actuating member and secured against rotation relative to the spindle and the actuating member to bias the valve toward the temperature responsive member, said spindle and said housing each including a conical portion one abutting against the other by the action of said spring, and stop means engaging the valve and preventing rotation of the valve relative of the housing.

2. An apparatus as described in claim 1, wherein said housing duct includes several branches, and wherein said valve includes several seatings, each controlling one of said branches.

3. An apparatus as described in claim 1, wherein the ends of said springs are bent off in the direction of the spring axis, and wherein said spindle and said actuating member include recesses engaged by said bent-off spring ends.

4. An apparatus for thermostatically controlling the flow of a fuel fluid, comprising a housing including a fluid duct having several branches, a valve having several seatings each controlling one of the branches by the valve position, a valve actuating member threaded upon the valve, a heat responsive member engaging the valve actuating member for control of the valve position by the heat responsive member, a manually operable setting member, a spindle, an edgewise coiled compression spring having bent-off ends engaging corresponding recesses in the spindle and the valve actuating member for adjusting the valve relative to the said actuating member and thereby the valve position, and a peg member secured to said housing and engaging a corresponding recess in the valve to prevent rotation of the latter relative to the housing, said spindle and said housing each including a conical portion one abutting against the other by the action of said spring.

5. An apparatus as described in claim 4, in which the portion of the peg member extending into the valve recess is ball-shaped.

6. An apparatus as described in claim 4, in combination with a calibrated setting head supported on the spindle rotatably about the spindle axis, and setting means for securing the setting head in a selected angular position on the spindle.

7. An apparatus as described in claim 4, wherein the surfaces of the spindle and of the actuating member facing each other are each plane and parallel to each other to guide and support the compression spring thereinbetween.

8. An apparatus as described in claim 4, wherein said housing includes a fluid chamber, an inlet and an outlet conduit each communicating with the fluid chamber, and wherein all of the branches of said duct communicate with the outlet conduit.

GERHARD TEDDY SALINGER.

REFERENCES CITED

The following references are of record in the file of this patent:

UNITED STATES PATENTS

| Number | Name | Date |
|---|---|---|
| 1,117,790 | Chapman | Nov. 17, 1914 |
| 1,814,491 | O'Dowd | July 14, 1931 |
| 1,824,057 | Robertshaw et al. | Sept. 22, 1931 |
| 1,839,229 | Kolts | Jan. 5, 1932 |
| 2,055,922 | Brennen | Sept. 29, 1936 |
| 2,100,681 | Arquint | Nov. 30, 1937 |
| 2,280,051 | Anderson | Apr. 21, 1942 |

FOREIGN PATENTS

| Number | Country | Date |
|---|---|---|
| 13,867 | Australia | June 14, 1929 |
| 126,605 | Switzerland | July 2, 1928 |
| 393,593 | Great Britain | June 6, 1933 |